US006688675B2

(12) United States Patent
Polzer et al.

(10) Patent No.: US 6,688,675 B2
(45) Date of Patent: Feb. 10, 2004

(54) ARRANGEMENT FOR FASTENING A BODY ELEMENT

(75) Inventors: Patrick Polzer, Muehlacker (DE); Wilfried Eberle, Ehingen (DE); Ruediger Jahn, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/263,776

(22) Filed: Oct. 4, 2002

(65) Prior Publication Data

US 2003/0080584 A1 May 1, 2003

(30) Foreign Application Priority Data

Oct. 4, 2001 (DE) .......................................... 101 49 003

(51) Int. Cl.⁷ .............................................. B60R 19/24
(52) U.S. Cl. ................... 296/187.11; 293/126; 293/155
(58) Field of Search ..................... 296/195, 29, 187.01, 296/187.11, 187.03, 193.08; 293/126, 154, 155

(56) References Cited

U.S. PATENT DOCUMENTS

| 4,875,728 A | * | 10/1989 | Copp et al. ................. 293/126 |
| 4,895,405 A | * | 1/1990 | Sasatake et al. ............ 293/154 |
| 4,895,406 A | * | 1/1990 | Goesse et al. .............. 296/195 |
| 5,029,920 A | * | 7/1991 | Furuta et al. ................ 293/154 |
| 5,061,108 A | * | 10/1991 | Bien et al. ..................... 403/24 |
| 5,882,054 A | * | 3/1999 | Devilliers et al. .......... 293/155 |
| 5,957,512 A | * | 9/1999 | Inada et al. .................. 293/155 |
| 6,003,933 A | * | 12/1999 | Rinklin ....................... 293/126 |
| 6,592,164 B2 | * | 7/2003 | Nagae et al. .................. 296/29 |
| 6,598,924 B2 | * | 7/2003 | Palmer et al. |
| 2002/0149221 A1 | * | 10/2002 | Palmer et al. ................. 296/29 |
| 2002/0158484 A1 | * | 10/2002 | Delavalle et al. ............. 296/29 |
| 2002/0163216 A1 | * | 11/2002 | Delavalle et al. ............. 296/29 |
| 2003/0015882 A1 | * | 1/2003 | Nagae et al. .................. 296/29 |

FOREIGN PATENT DOCUMENTS

| DE | 3629124 | * | 11/1987 | ................. 296/187 |
| DE | 44 32 764 A1 | | 3/1996 | |
| DE | 197 41 062 A1 | | 4/1999 | |
| EP | 0 808 765 | | 11/1997 | |
| JP | 57-18540 | * | 1/1982 | ................. 293/154 |
| JP | 57-18541 | * | 1/1982 | ................. 293/154 |
| JP | 59-184066 | * | 10/1984 | ................. 296/195 |
| JP | 60-4443 | * | 1/1985 | ................. 293/154 |
| JP | 2-37086 | * | 2/1990 | ................. 293/155 |

* cited by examiner

Primary Examiner—Joseph D. Pape
Assistant Examiner—H. Gutman
(74) Attorney, Agent, or Firm—Crowell & Moring LLP

(57) ABSTRACT

For fixing a rear covering part on a side part with a zero gap, a guide rail is provided in the side part and is locked in place in channel-type supports, into which guide rail the rear covering part is slid. The guide rail is durably held in a precise position with respect to the side part.

12 Claims, 4 Drawing Sheets

ARRANGEMENT FOR FASTENING A BODY ELEMENT

BACKGROUND OF THE INVENTION

The present invention relates to a device for fixing vehicle body parts, particularly a rear covering part of a motor vehicle in a guide rail connected with the vehicle body and having receiving legs for fixing the vehicle body.

DE 197 41 062 A1 discloses a multi-function rail for securing and mounting, aligning and fixing of vehicle body parts on a mounted part. The rail is slidably preassembled and, for this purpose, has so-called keyholes.

SUMMARY OF THE INVENTION

An object of the present invention is to provide a device for fixing vehicle body parts, particularly a rear covering part on a guide rail of a side part, by way of which it is possible to ensure in a simple manner a defined and durable gap measurement between the side part and the rear covering part.

According to the invention, this object has been achieved by providing, in a section of a side part oriented outwardly of the vehicle body and extending approximately horizontally in a driving direction, a first channel support which, in at least one area, has a branching-off, downward-oriented, second channel support wherein the guide rail is held in the first and second channel supports by corresponding channel shaped-out sections.

The principal advantages achieved by the invention are that, with a precisely positionable guide rail at the respective side part of the vehicle, a rear covering part can be mounted with a so-called zero gap.

According to the present invention, this object is achieved in that, in each case, in a section of the side part oriented to the outside of the vehicle and extending approximately horizontally, a first channel-type support is provided which has in at least one area a branching-off, downward-oriented channel-type support. By way of corresponding channel-type shaped-out sections, the guide rail is held in a positionally precise manner in the two supports.

As a result of this construction of the side part and the guide rail arranged therein in a positioned manner, a so-called zero gap is durably permitted between the side part and the mounted rear covering.

In particular, the first channel-type support is arranged on an edge area of the side part in a vertical plane and is constructed with a U-profile-shaped cross-section. This marginal area of the side part is adjoined by a metal holding plate for a bumper in which the second channel-type support is partially arranged. Thus, the rear covering can be fastened by way of the guide rail immediately adjoining the edge of the side covering, in which case the downward oriented second support ensures a secured fixing of the guide rail in the X-direction as a result of the lengthening in the metal holding plate for the bumper.

The shaped-out sections of the guide rail as well as the channel-type supports have a U-shaped profile, so that the guide rail is received in the channel-type supports and locking between the rail and supports is ensured by the respective forms or profiles.

The guide rail preferably has an oblong shaped-out section which has a U-profile-shaped cross-section and which is arranged in the first channel-type support. By way of a leg of the shaped-out section, the guide rail is held on a side wall of the channel-type support and is positioned in the Z-direction. As a result of this support of the guide rail on the side wall of the channel-type support, the rear covering can also be positioned precisely with respect to the side part and a stable fixing with respect to the side part is achieved.

The second branching-off channel-type support in the edge of the side part as well as in the edge of the metal holding plate has a shaping in which the guide rail is held by means of a shaped-out section in the X-direction. Because the side part has a downward-oriented rounding on the end side, by way of the second channel-type support, resting of the rear covering part on the side part can be achieved with a so-called zero gap.

As a result of the two channel-type supports in the side part, resting of the rear covering part against the side part with a zero gap is advantageously achieved according to the invention and a lowering of the rear covering part is excluded because the guide rail is held in a tightly fixed manner in the two channel-type supports of the side part.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
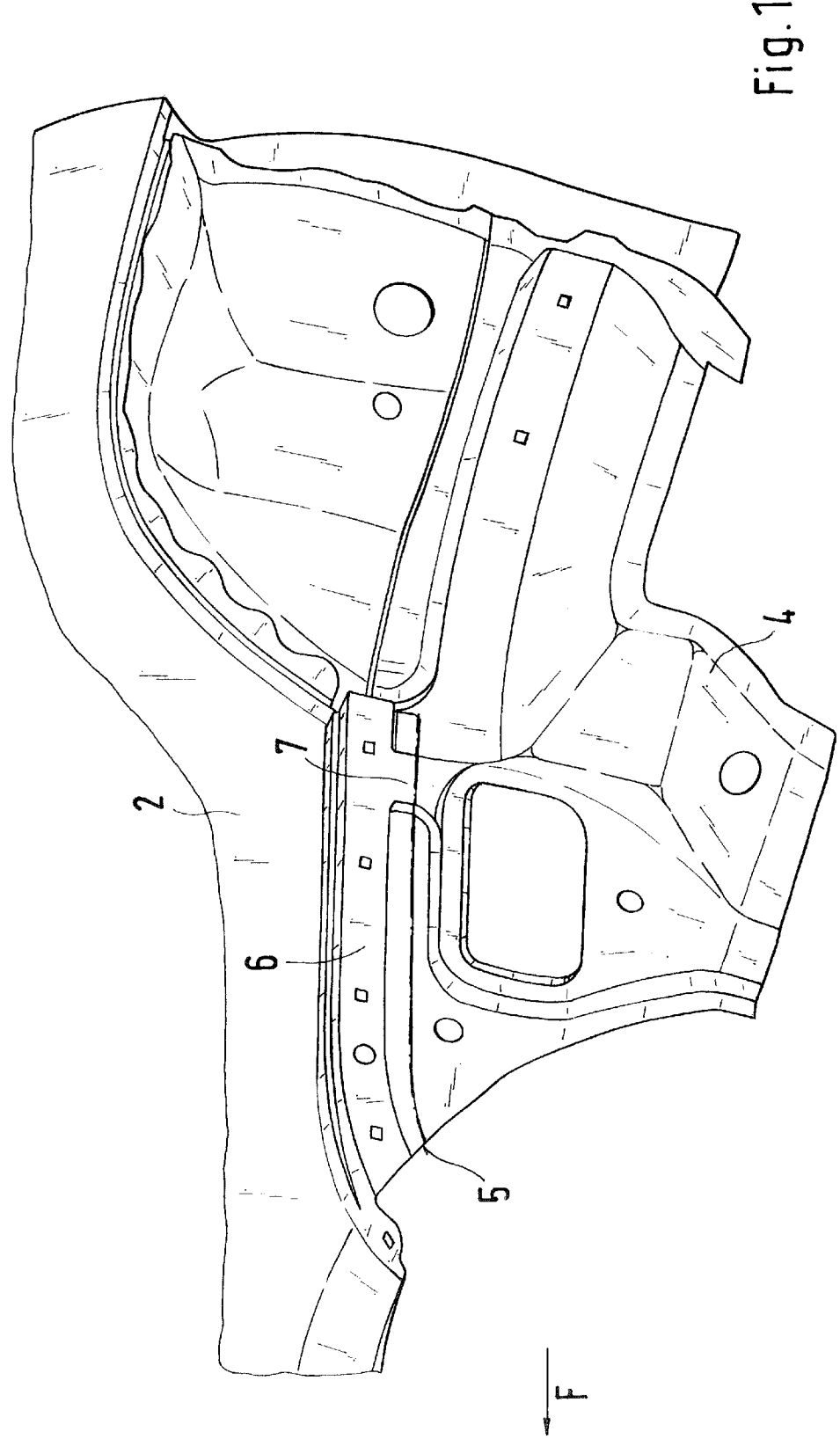
FIG. 1 is a view from the outside of a left side part of the vehicle body as viewed in the driving direction and has a connected metal holding plate for a bumper and two channel-type supports in the side part or in the metal holding plate.
Figure 2:
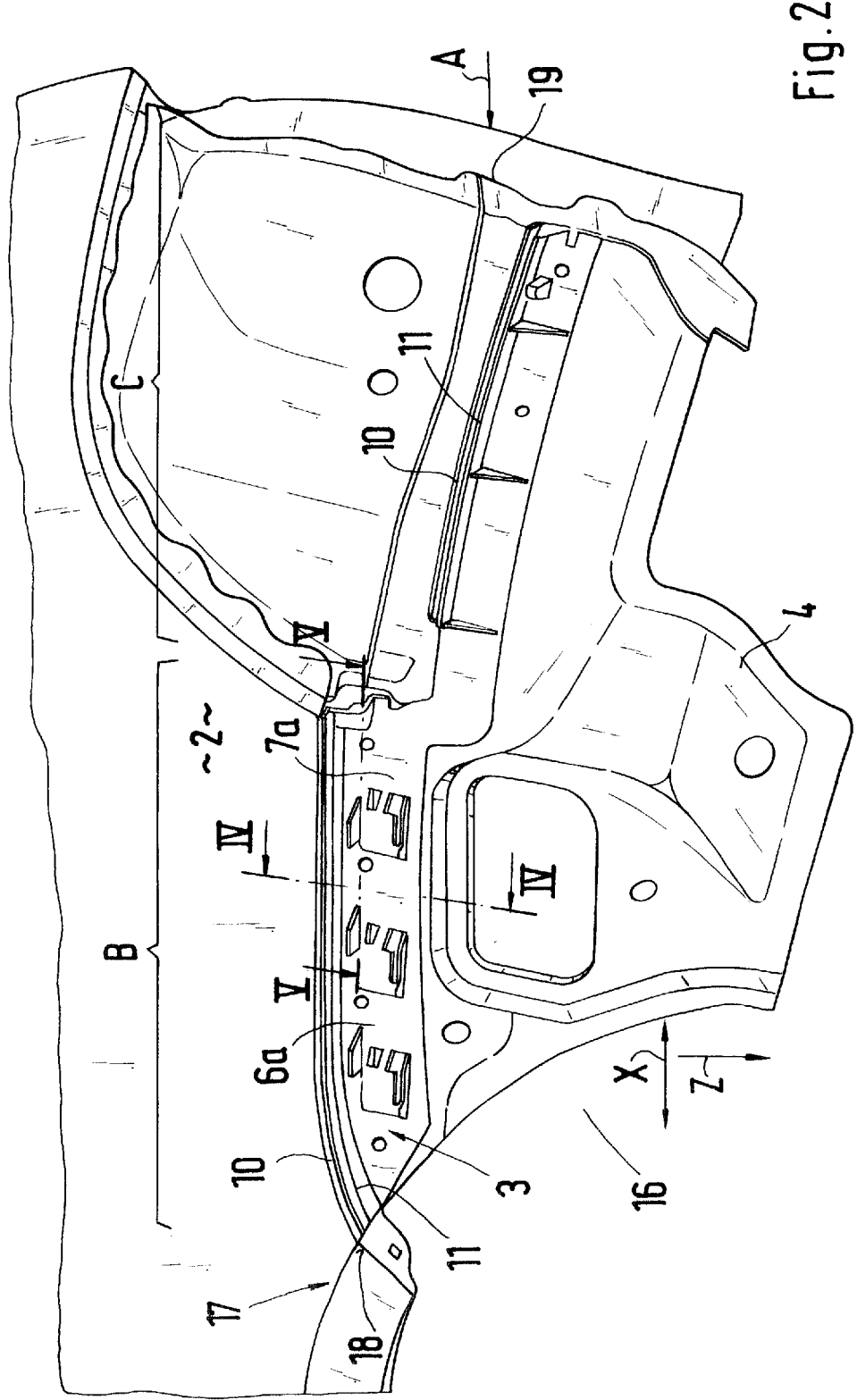
FIG. 2 is a view similar to FIG. 1 but with a guide rail inserted in the channel-type supports.
Figure 3:
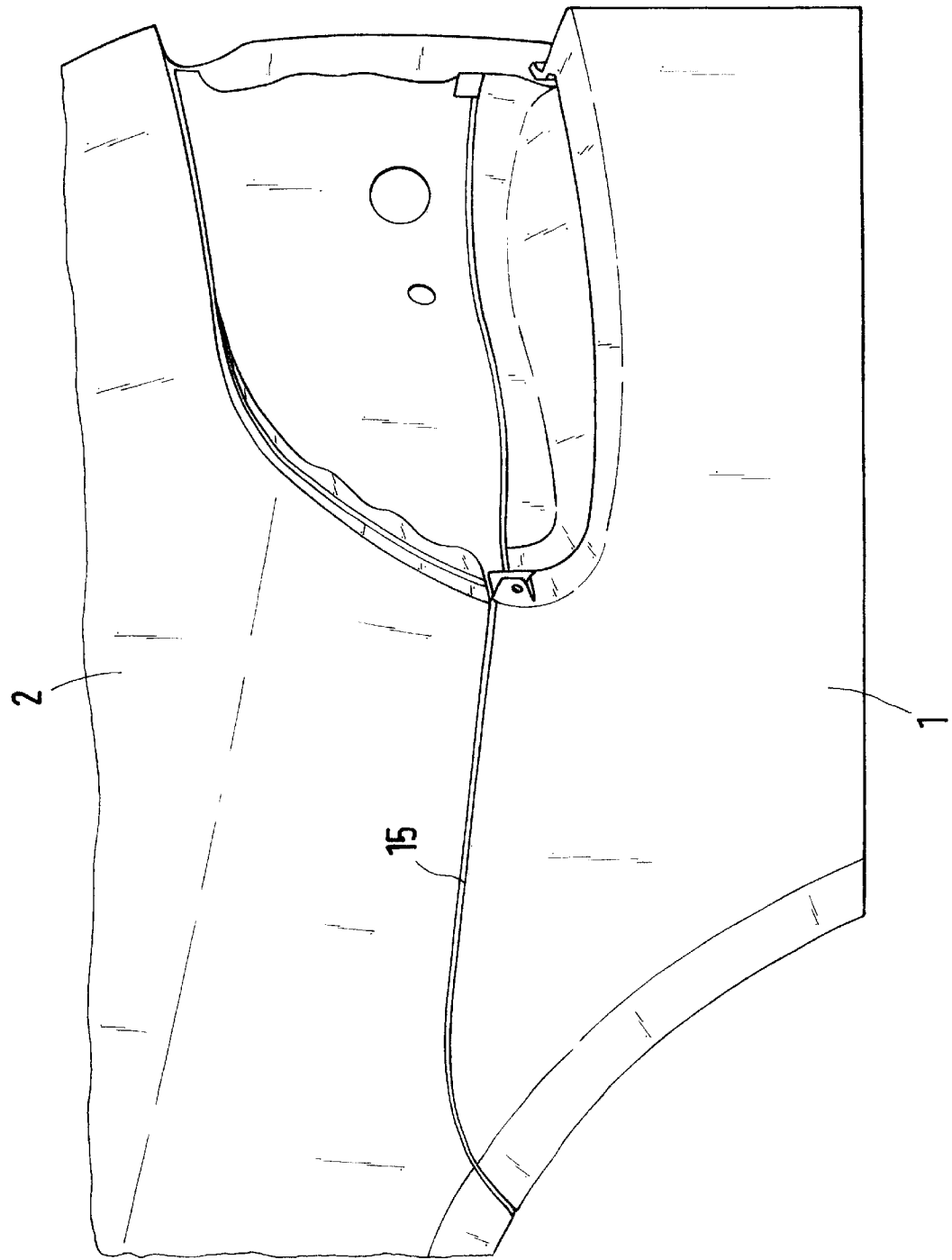
FIG. 3 is a view of the side part of FIGS. 1 and 2 with a connected rear covering part.

For purposes of orientation, the driving direction is designated by arrow F in FIG. 1. The device for fixing vehicle body parts, particularly a rear covering part 1 to a side part 2 of a motor vehicle, comprises essentially a guide rail 2 which is constructed with the side part 2 and a metal holding plate 4 for a bumper. The metal holding plate 4 is connected with the side part 2.

A metal holding plate 4 is fastened to a lower connection edge 5 of the side part 2. The side part 2 has a channel-type, approximately horizontally extending first support 6 which, in the rear section, has a downward-oriented second channel-type support 7 which extends partially into the metal holding plate 4. These channel-type supports 6, 7 consist of depressions and have a U-profile-shaped cross-section.

The guide profile 3 is inserted into these channel-type supports and, corresponding to these supports 6, 7, also consists of a shaped-out section in the form of a U-profile-shaped cross-section 6a and, in the rearward area, has a downward-oriented recess 7a corresponding to the support 7.

For receiving the rear covering part 1, the guide rail 3 has legs or lugs 10, 11, between which an edge of the rear covering part 1 is pushed in the direction of the arrow A and is fastened to the guide rail 3.

The guide rail 3 is fastened by screwing devices 13 in the channel-type support 6, so that a stable position is ensured. Support of the guide rail 3 in the Z-direction takes place on the side wall 14 of the channel-type support 6. In the X-direction, the guide rail 3 is held in the downward-oriented support 7 on the corresponding lateral wall parts.

Figure 4:
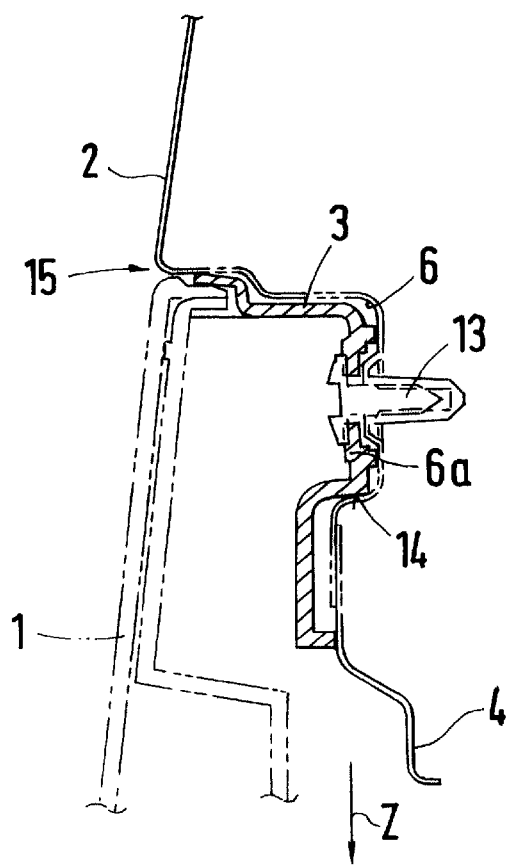
FIG. 4 is a sectional view of the side part with the guide rail along line IV—IV of FIG. 2.
Figure 5:
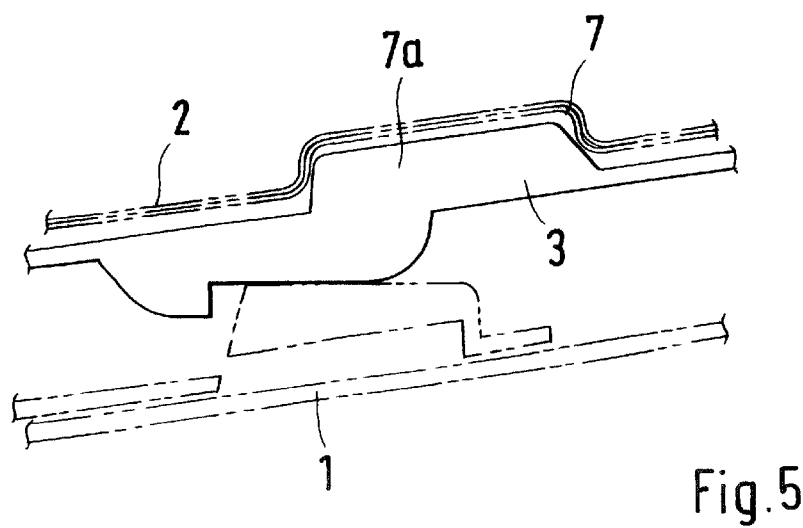
FIG. 5 is a sectional view of the side part with the guide rail along line V—V of FIG. 2.

As a result of this support in the Z- and X-direction, a holding of the rear covering part 1 is achieved in a precise position on the side part 2 with a so-called zero gap 15. That is, the parts 1 and 2 rest against one another in a precisely fitting manner, as illustrated in detail in FIG. 4.

On an end 17 facing the wheel opening 16, the side part 2 has a downward-oriented rounding 18. The guide rail 3 is constructed correspondingly. As a result of the also downward-oriented guide rail 3 in this area, a tight resting of the rear covering part 1 on the side part 2 is necessarily achieved via the support 7.

The guide profile 3 preferably extends from the rounded end 17 of the side part 2 to the rearward end 19 of the side part 2 or of the metal holding plate 4. The channel-type support 6 extends in the side part 2 only over a limited area B. In the further area C of the side part 2 or of the metal holding plate 4, the guide rail 3 is connected directly without a channel-type support with the metal holding plate 4.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. Device for fixing vehicle body parts, including a rear covering of a motor vehicle in a guide rail which is connected with a vehicle body and has receiving legs for fixing to the vehicle body, comprising in a section of a side part oriented outwardly of the vehicle body and extending approximately horizontally in a driving direction, a first channel support which, in at least one area, has a branching-off, downward-oriented, second channel support wherein the guide rail is held in the first and second channel supports by corresponding channel shaped-out sections.

2. Device according to claim 1, wherein the first channel support on an edge area of the side part is arranged in an approximately vertical plane and has an approximately U-profile-shaped cross-section, and the edge area is adjoined by a metal holding plate for use in a bumper in which the second channel support is partially continued.

3. Device according to claim 1, wherein the guide rail has an oblong shaped-out section having an approximately U-profile-shaped cross-section and arranged in the first channel support and is held by a lower leg of the shaped-out section on a side wall of the first channel support and is positioned in a first direction.

4. Device according to claim 3, wherein the first channel support on an edge area of the side part is arranged in an approximately vertical plane and has an approximately U-profile-shaped cross-section, and the edge area is adjoined by a metal holding plate for use in a bumper in which the second channel support is partially continued.

5. Device according claim 1, wherein the second channel support at an edge of the side part as well as at an edge of the metal holding plate has a configuration in which the guide rail is held by a shaped-out section in a second direction.

6. Device according to claim 5, wherein the guide rail has an oblong shaped-out section having an approximately U-profile-shaped cross-section and arranged in the first channel support and is held by a lower leg of the shaped-out section on a side wall of the first channel support and is positioned in a first direction.

7. Device according to claim 6, wherein the first channel support on an edge area of the side part is arranged in an approximately vertical plane and has an approximately U-profile-shaped cross-section, and the edge area is adjoined by a metal holding plate for use in a bumper in which the second channel support is partially continued.

8. Device according to claim 2, wherein the guide rail is operatively held by one end over an area, on one side at the side part in the first and second channel supports and, on another side, is fastened by another end thereof over an area on the metal holding plate.

9. Device according to claim 8, wherein the guide rail has an oblong shaped-out section having an approximately U-profile-shaped cross-section and arranged in the first channel support and is held by a lower leg of the shaped-out section on a side wall of the first channel support and is positioned in a first direction.

10. Device according to claim 9, wherein the first channel support on an edge area of the side part is arranged in an approximately vertical plane and has an approximately U-profile-shaped cross-section, and the edge area is adjoined by a metal holding plate for use in a bumper in which the second channel support is partially continued.

11. Device according claim 10, wherein the second channel support in the edge of the side part as well as in the edge of the metal holding plate has a configuration in which the guide rail is held by a shaped-out section in a second direction.

12. Device according to claim 6, wherein the guide rail, on a free end of the first channel support, has a curved shape corresponding to a shape of the side part, and the rear covering, which is insertable in the guide rail, rests in a fixed manner on a gap edge of the side part fixed in the second direction and a third direction.

* * * * *